Patented May 18, 1937

2,080,767

UNITED STATES PATENT OFFICE 2,080,767

MANUFACTURE OF HYDROCARBON GASES

Henry Dreyfus, London, England

No Drawing. Application October 23, 1934,
Serial No. 749,675. In Great Britain October
26, 1933

13 Claims. (Cl. 260—170)

This invention relates to the manufacture of hydrocarbon gases and in particular to the manufacture of unsaturated hydrocarbon gases.

I have found that acetylene and other unsaturated hydrocarbon gases, for instance ethylene, may be manufactured by causing carbon to react with methane and/or hydrogen at elevated temperatures. In general the reaction may be carried out at temperatures above 1000° C., while temperatures above 1300° C., for example temperatures of 1400° or 1500° to 2000° C., are specially valuable.

In order to promote reaction between the gaseous methane and/or hydrogen and the solid carbon the latter is preferably, though not essentially, employed in a form having a high surface : weight ratio, for example in the form of a porous mass such as charcoal. Advantageously the carbon may be employed in a comparatively fine state of division. Thus, for example, the methane and/or hydrogen may be heated to the required temperature with lamp black or soot or pulverized coal or coke or other finely divided form of carbon. The process of the invention therefore permits of working up not only the large quantity of methane that is formed as a by-product in various industries, but also the least valuable forms of coal represented by coal dust and slack of various grades.

In order to direct the reaction as far as possible in the required direction and to minimize undesirable side reactions, such as the simple thermal decomposition of methane into its elements, the period during which the methane and/or hydrogen and the carbon are under reaction conditions is preferably kept short; as a general rule it may be stated that the higher the temperature the shorter the time required for the reaction to take place. Thus when the reaction is carried out at a temperature of about 1650°–1700° C., a period of the order of 1 or 2 seconds or even less will usually be sufficient. Shorter periods are, in general, required when the carbon is in a fine state of division than when it is in the form of larger particles or in a porous form as in charcoal or the like. It is also important that the gases leaving the reaction zone be cooled as rapidly as possible.

The use of reduced pressure is also advantageous; for example pressures between 0.25 and 1 atmosphere may be employed, although it is frequently more convenient for technical reasons to work at atmospheric pressure. If desired, the partial pressure of the methane and/or hydrogen may be lowered by the addition of an inert gas, for instance nitrogen. It has been found that a higher yield of acetylene may frequently be obtained from mixtures of methane and hydrogen than from methane alone.

Not only is heat required to raise the methane and/or hydrogen and the carbon to the required temperature, but since the formation of acetylene from its elements or from methane and carbon is a strongly endothermic reaction, a considerable amount of heat energy is consumed therein. The invention is not limited as to the method by which the heat required is obtained and transmitted to the reactants. Thus for example use may be made of an electric arc or other type of electric furnace; electrodes or other heating elements employed for this purpose are, even if they comprise carbon, preferably distinct from the carbon which is required for reaction with the methane; conveniently they may be formed of a hard massive graphitic type of carbon.

Advantageously however the heat may be produced by the combustion of methane and/or hydrogen other than that which is to react with the carbon or of other gases which may be available. The heat produced in this way may be applied indirectly; for example the reaction zone may be heated externally or internally, as for instance by means of a series of fire-tubes or the like. Preferably however the reactants are directly heated by the burning gases, and processes in which the reaction between methane and/or hydrogen and carbon is effected in a flame of burning gas constitute a particularly valuable method of applying the reaction.

Thus according to one such process pulverized coke or other finely divided form of carbon may be blown by means of a stream of methane and/or hydrogen or of an inert gas through a flame produced by burning a mixture of methane and/or hydrogen and air or, if higher temperatures are desired, methane and/or hydrogen and a gas mixture comprising a higher percentage of oxygen than does air. Advantageously the methane and/or hydrogen in the combustion mixture is present in slight excess or in substantially the proportion required for the total consumption of the oxygen. Flames produced by burning other gases may be substituted for the methane or hydrogen flame, or the methane and/or hydrogen may be used in admixture with other gases.

In another method in which the process of the invention may be carried into practice, the carbon may be in a porous form possessing a large surface:weight ratio, such as charcoal or a highly porous form of coke, and may be directly heated by a methane-air or other suitable flame, while methane and/or hydrogen is blown through the carbon. For example, the combustion mixture may be led into the zone containing the carbon by means of one or preferably a number of heat-resistant tubes which may be provided with combustion nozzles or nipples, while substantially pure methane or hydrogen may be led into the reaction zone by means of further tubes. Instead of introducing the combustion mixture through the nozzles, air or oxygen may be so introduced while methane and/or hydrogen is caused to flow rapidly past the combustion nozzles, (where an "inverted flame" of oxygen burning in methane or hydrogen is produced thereby heating the unburnt gas), through or otherwise in contact with the carbon, and thence to a cooling zone. After separation of the acetylene and preferably of the combustion products the gases may be recirculated.

Whatever the method of carrying out the reaction the methane and/or hydrogen may with advantage be preheated, for example to a temperature of about 500° to 800° or 1000° C., before and preferably substantially immediately before entering the reaction zone. This preheating may be partly or completely performed by passing the gas in heat exchange with the products leaving the reaction zone, care being taken that the products are cooled rapidly.

The process of the invention may be carried out as a continuous or a discontinuous operation. For example, when the carbon is employed in a finely divided form and blown into the reaction zone with the methane or hydrogen or with a diluent gas as has been described, the process may be carried out continuously. On the other hand, when a coherent form of carbon is used, it may be more convenient to work the process intermittently. When this is done, it is of advantage to employ a number of reaction vessels in parallel, so that a continuous production of acetylene may be maintained; for example out of a battery of ten such reaction vessels, at any particular time, seven may be working while the remaining three are cleaned out and refilled. After refilling a vessel, care should be taken that the air is substantially completely expelled before the commencement of the reaction. Advantageously, the air may be removed by evacuation or by means of a gas of density widely different from that of air, for example carbon dioxide or hydrogen.

Methane for use in the process may be either pure or in admixture with oxides of carbon or with other hydrocarbons, as for example in natural gas, and/or with inert gases such as nitrogen or with hydrogen as already described. Similarly hydrogen may be used in admixture with other gases, for example as in water gas or producer gas, whether or not methane is also present. When gas mixtures containing considerable proportions of oxides of carbon are to be used as raw materials, a hydrogenation step whereby these substances may be converted into methane or other hydrocarbons may be carried out before the main reaction. For example the gases may be passed over an iron or other suitable catalyst at an elevated temperature.

The gases leaving the reaction zone comprise acetylene and unchanged methane or hydrogen, and according to the conditions under which the process is carried out, they may or may not contain an inert gas and/or combustion products such as oxides of carbon and water vapour. In addition, other hydrocarbons may be present, especially if coal dust or pulverized coal be employed in the process, but usually only in quite unimportant quantities. The gases may be subjected to any desired treatment. If the gases contain undesirable proportions of unconsumed finely divided carbon, they may be subjected to any treatment such as electrical precipitation, whereby such solid particles may be removed. Water vapour, for example, may be removed by condensation or other treatment, while the acetylene may be converted into acetaldehyde or subjected to any other desired operation.

What I claim and desire to secure by Letters Patent is:—

1. Process for the manufacture of unsaturated hydrocarbon gases, which comprises causing carbon to react with at least one of the gases selected from the group consisting of methane and hydrogen at a temperature above 1000° C. and supplying heat to the reactants by the combustion of a gas within the reaction zone during the reaction.

2. Process according to claim 1 in which the pressure due to the reactant gas is less than atmospheric.

3. Process for the manufacture of unsaturated hydrocarbon gases, which comprises causing carbon to react with at least one of the gases selected from the group consisting of methane and hydrogen at a temperature above 1000° C. and supplying heat to the reactants by burning at least one of the reactant gases within the reaction zone during the reaction.

4. Process for the manufacture of unsaturated hydrocarbon gases, which comprises causing carbon to react with hydrogen by blowing finely divided carbon through a flame of burning hydrogen at a temperature of above 1000° C. so that part of the hydrogen present reacts with the carbon and part is burnt to supply heat to the reaction.

5. Process for the manufacture of unsaturated hydrocarbon gases, which comprises causing carbon to react with methane by blowing finely divided carbon through a flame of burning methane at a temperature of above 1000° C. so that part of the methane present reacts with the carbon and part is burnt to supply heat to the reaction.

6. Process for the manufacture of unsaturated hydrocarbon gases, which comprises causing carbon to react with hydrogen by blowing finely divided carbon by means of hydrogen through a flame of burning hydrogen at a temperature of above 1000° C. so that part of the hydrogen present reacts with the carbon and part is burnt to supply heat to the reaction.

7. Process for the manufacture of unsaturated hydrocarbon gases, which comprises causing carbon to react with methane by blowing finely divided carbon by means of methane through a flame of burning methane at a temperature of above 1000° C. so that part of the methane present reacts with the carbon and part is burnt to supply heat to the reaction.

8. Process for the manufacture of unsaturated hydrocarbon gases, which comprises causing carbon to react with at least one of the gases selected from the group consisting of methane and hydrogen at a temperature above 1300° C. and supplying heat to the reactants by the combustion of a gas within the reaction zone during the reaction.

9. Process for the manufacture of unsaturated hydrocarbon gases, which comprises causing carbon to react with methane by blowing finely divided carbon through a flame of burning methane at a temperature of above 1300° C. so that part of the methane present reacts with the carbon and part is burnt to supply heat to the reaction.

10. Process for the manufacture of unsaturated hydrocarbon gases, which comprises causing carbon to react with hydrogen by blowing finely divided carbon through a flame of burning hydrogen at a temperature of above 1300° C. so that part of the hydrogen present reacts with the carbon and part is burnt to supply heat to the reaction.

11. Process for the manufacture of unsaturated hydrocarbon gases, which comprises causing carbon to react with at least one of the gases selected from the group consisting of methane and hydrogen at a temperature between 1400° and 2000° C. and supplying heat to the reactants by the combustion of a gas within the reaction zone during the reaction.

12. Process for the manufacture of unsaturated hydrocarbon gases, which comprises causing carbon to react with methane at a temperature between 1400° and 2000° C. and supplying heat to the reactants by burning methane within the reaction zone during the reaction.

13. Process for the manufacture of unsaturated hydrocarbon gases, which comprises causing carbon to react with hydrogen at a temperature between 1400° and 2000° C. and supplying heat to the reactants by burning hydrogen within the reaction zone during the reaction.

HENRY DREYFUS.